United States Patent
Tsirkin (10) Patent No.: US 11,175,938 B2
(45) Date of Patent: Nov. 16, 2021

(54) CENTRAL PROCESSING UNIT SUPPORT FOR EFFICIENT TIMERS AT LOW POWER STATES

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 92 days.

(21) Appl. No.: 16/394,878

(22) Filed: Apr. 25, 2019

(65) Prior Publication Data

US 2020/0341790 A1 Oct. 29, 2020

(51) Int. Cl.
| | |
|---|---|
| G06F 9/46 | (2006.01) |
| G06F 9/455 | (2018.01) |
| G06F 1/3228 | (2019.01) |
| G06F 1/28 | (2006.01) |

(52) U.S. Cl.
CPC ............ *G06F 9/45558* (2013.01); *G06F 1/28* (2013.01); *G06F 1/3228* (2013.01); *G06F 2009/45591* (2013.01)

(58) Field of Classification Search
CPC ...... G06F 9/45558; G06F 1/28; G06F 1/3227; G06F 1/3228
See application file for complete search history.

(56) References Cited

U.S. PATENT DOCUMENTS

| | | | | |
|---|---|---|---|---|
| 6,378,018 B1* | 4/2002 | Tsern | ................... | G06F 13/4243 710/313 |
| 8,495,331 B2* | 7/2013 | Matsumoto | ........... | G06F 3/0608 711/170 |
| 9,501,137 B2 | 11/2016 | Kruglick | | |
| 9,575,543 B2 | 2/2017 | Conrad et al. | | |
| 9,753,531 B2 | 9/2017 | Jahagirdar et al. | | |
| 10,162,658 B2 | 12/2018 | Nicholas et al. | | |
| 2010/0192149 A1 | 7/2010 | Lathrop et al. | | |
| 2010/0218183 A1 | 8/2010 | Wang et al. | | |
| 2011/0154323 A1 | 6/2011 | Arndt et al. | | |
| 2011/0187438 A1* | 8/2011 | Yeung | ....................... | G05F 1/10 327/419 |
| 2014/0181811 A1 | 7/2014 | Tsirkin et al. | | |
| 2015/0193249 A1 | 7/2015 | Van Riel et al. | | |
| 2015/0242229 A1 | 8/2015 | Van Riel et al. | | |
| 2016/0224362 A1* | 8/2016 | Tsirkin | ................... | G06F 9/4812 |
| 2018/0011733 A1* | 1/2018 | Tsirkin | ................ | G06F 9/45533 |
| 2018/0060103 A1 | 3/2018 | Tsirkin | | |
| 2018/0113764 A1 | 4/2018 | Bhandari et al. | | |
| 2018/0341510 A1 | 11/2018 | Tsirkin | | |

OTHER PUBLICATIONS

Onaindia et al., A Hypervisor Architecture for Low-Power Real-Time Embedded Systems, 21st Euromicro Conference on Digitial System Design, DSD, 2018, 8 pages, Prague, Czech Republic.

* cited by examiner

*Primary Examiner* — Camquy Truong
(74) *Attorney, Agent, or Firm* — Lowenstein Sandler LLP (57) ABSTRACT

A hypervisor managing a virtual machine (VM) running on a host computer system, modifies a virtual machine control structure (VMCS) associated with the VM to trigger a VM exit upon detecting a transition of the VM to a specified power state. Upon detection of the VM exit, a timer is initialized to trigger another VM exit, and execution of the VM in the specified power state is resumed.

11 Claims, 5 Drawing Sheets

CENTRAL PROCESSING UNIT SUPPORT FOR EFFICIENT TIMERS AT LOW POWER STATES

TECHNICAL FIELD

The present disclosure is generally related to computer systems, and more particularly, to managing virtual machine exit in a power-efficient manner.

BACKGROUND

Virtualization allows multiplexing of an underlying host computer system (also referred to as a "host machine") between different virtual machines (VMs). The host machine allocates a certain amount of its resources to each of the virtual machines. Each virtual machine is then able to use the allocated resources to execute applications, including operating systems (OS) (referred to as guest OS). An executable layer that provides the virtualization is commonly referred to as a hypervisor (also known as a virtual machine monitor (VMM)). The hypervisor emulates the underlying hardware of the host machine, making the use of the virtual machine transparent to the guest OS and the user of the guest VM.

A computer processor (e.g., a Central Processing Unit (CPU)) of the host machine can enter a low-power mode (e.g., an idle mode) when it is not executing a task. In a low-power mode, the processor remains partially or completely idle until a signal is received, such as an interrupt signal, indicating that the parts of the processor that were shut off should be turned back on to execute a task. A hypervisor monitors the current power state of the guest VMs to allow efficient multiplexing of the host resources between different guest VMs.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Aspects of the present disclosure are directed to systems and methods for providing a mechanism for managing virtual machine (VM) exits efficiently when a guest CPU operates in certain low-power states.

A VM exit can involve a transfer of execution control from the VM to the hypervisor. Certain processor architectures allow VM exits triggered by a VM cycle counter (also referred sometimes as "VM counter" elsewhere in the specification), which would occur upon detecting that a processor has performed a configurable number of processing cycles in the guest mode. Such a mechanism avoids the need to send an interrupt to the host, and thus reduces the virtualization-related processing overhead. However, the VM cycle counter can only run in a subset of the CPU power states, while being unavailable in other power states (e.g., certain low power states), thus forcing the hypervisor to keep a timer running all the time in order to preempt the VM execution.

The systems and methods of the present disclosure address the above-noted and other deficiencies by configuring a virtual machine control structure (VMCS) to cause a VM exit upon detecting a virtual CPU (vCPU, defined as a physical CPU that is assigned to a VM) transition to a power state in which the VM cycle counter would not be available. Upon detecting a VM exit caused by such a transition, the hypervisor can start a timer for triggering a VM exit and resume the VM execution, thus allowing the VM to transition to the power state in which the VM cycle counter is not available, but a VM exit would be triggered by the timer. Upon detecting the timer-triggered VM exit, the hypervisor can disable the timer and enable the VM exits triggered by the VM counter.

Figure 1:
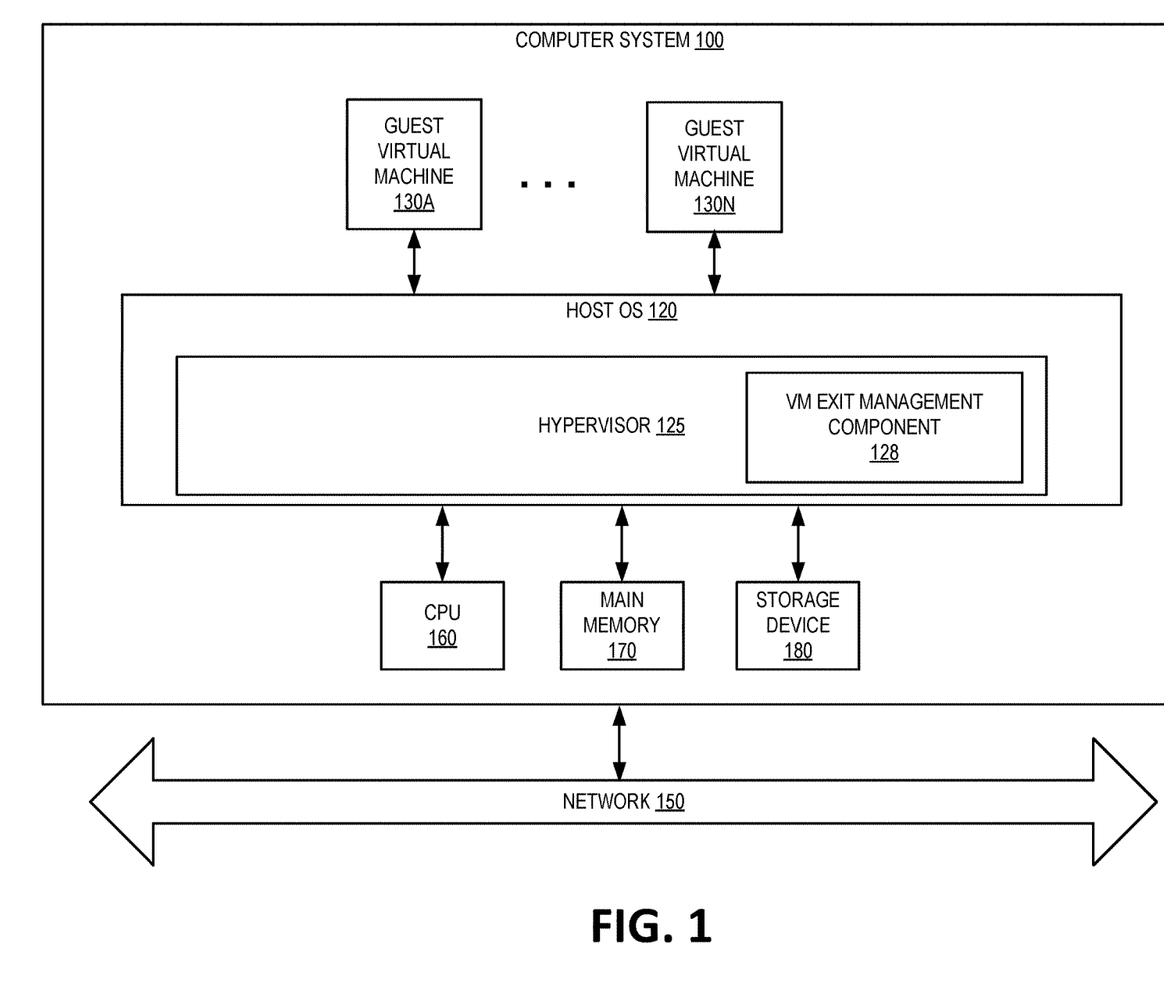
FIG. 1 depicts a high-level component diagram of an example computer system architecture, in accordance with one or more aspects of the present disclosure.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1.

As shown in FIG. 1, the computer system 100 is connected to a network 150 and comprises central processing unit (CPU) 160, main memory 170, which can include volatile memory devices (e.g., random access memory (RAM)), non-volatile memory devices (e.g., flash memory), and/or other types of memory devices, and storage device 180 (e.g., a magnetic hard disk, a Universal Serial Bus (USB) solid state drive, a Redundant Array of Independent Disks (RAID) system, a network attached storage (NAS) array, etc.) that serves as a secondary memory, interconnected as shown. The computer system 100 can be a server, a mainframe, a workstation, a personal computer (PC), a mobile phone, a palm-sized computing device, etc. The network 150 can be a private network (e.g., a local area network (LAN), a wide area network (WAN), intranet, etc.) or a public network (e.g., the Internet).

As mentioned before, the CPU 160 can run in one of a plurality of power states (also referred to as the "processor power states"). For example, CPU 160 can run in a processor power state where CPU 160 dispatches and executes instructions. As another example, CPU 160 can run in a power saving state (e.g., one of a plurality of low-power "idle" states) where no instructions are executed and power consumption is reduced to a desired level. The CPU can transition to a certain power state responsive to executing one or more predetermined instructions, such as a HALT instruction that halts CPU 160 (e.g., places CPU 160 in a HALT state) until an interrupt signal is sent to CPU 160, a MWAIT instruction that can halt CPU 160 until data has been written a memory address within a designated range, etc. In some embodiments, the processor power states can include one or more power states in accordance with the Advanced Configuration and Power Interface (ACPI) standard for device configuration and power management. The CPU 160 can run in one of four ACPI processor states: C0, C1, C2, or C3. State C0 can be a normal powered-on operating state of the CPU 160. States C1, C2, and C3 can each represent a different low power (idle) state. Each of the idle states can shut off a different portion of the CPU 160. For example, state C1 can be a "halt" state, in which CPU 160 is not executing instructions but can quickly (essentially instantaneously) return to state C0. State C2 can be a "stop-clock" state, in which the clocks of the CPU 160 are stopped but the state of software remains the same (i.e. is still visible to the processing core). It can take longer for the CPU 160 to return from state C2 to C0 than from C1 to C0. State C3 can be a "sleep" state, in which the internal and external processor clocks of the CPU 160 are stopped. It can take longer for the CPU 160 to return C3 to return to C0 than from C1 or C2. The CPU 160 can also be able to enter any number of additional or alternative power states.

It should be noted that although, for simplicity, a single CPU is depicted in FIG. 1, in some other embodiments computer system 100 can comprise a plurality of CPUs. Similarly, in some other embodiments computer system 100 can comprise a plurality of storage devices 180, rather than a single storage device 180.

Computer system 100 runs a host operating system (OS) 120, which can comprise software that manages the hardware resources of the computer system and that provides functions such as inter-process communication, scheduling, virtual memory management, and so forth. In some examples, host operating system 120 also comprises a hypervisor 125, which provides a virtual operating platform for guest VMs 130A, . . . , 130N and manages its execution. Each VM 130A-N can be software implementation of a machine that executes programs as though it were an actual physical machine. It should be noted that in some other examples, hypervisor 125 can be external to host OS 120, rather than embedded within host OS 120. As shown, hypervisor 125 can include a VM exit management component 128 that can facilitate power management for CPU 160 by implementing efficient timers, as described below with reference to FIGS. 3 and 4. In an idle state, at least part of the processor is shut off to reduce power consumption. As mentioned above, the CPU 160 can be put into one of many different idle states, such as one of four ACPI processor states: C0, C1, C2, or C3.

Figure 2:
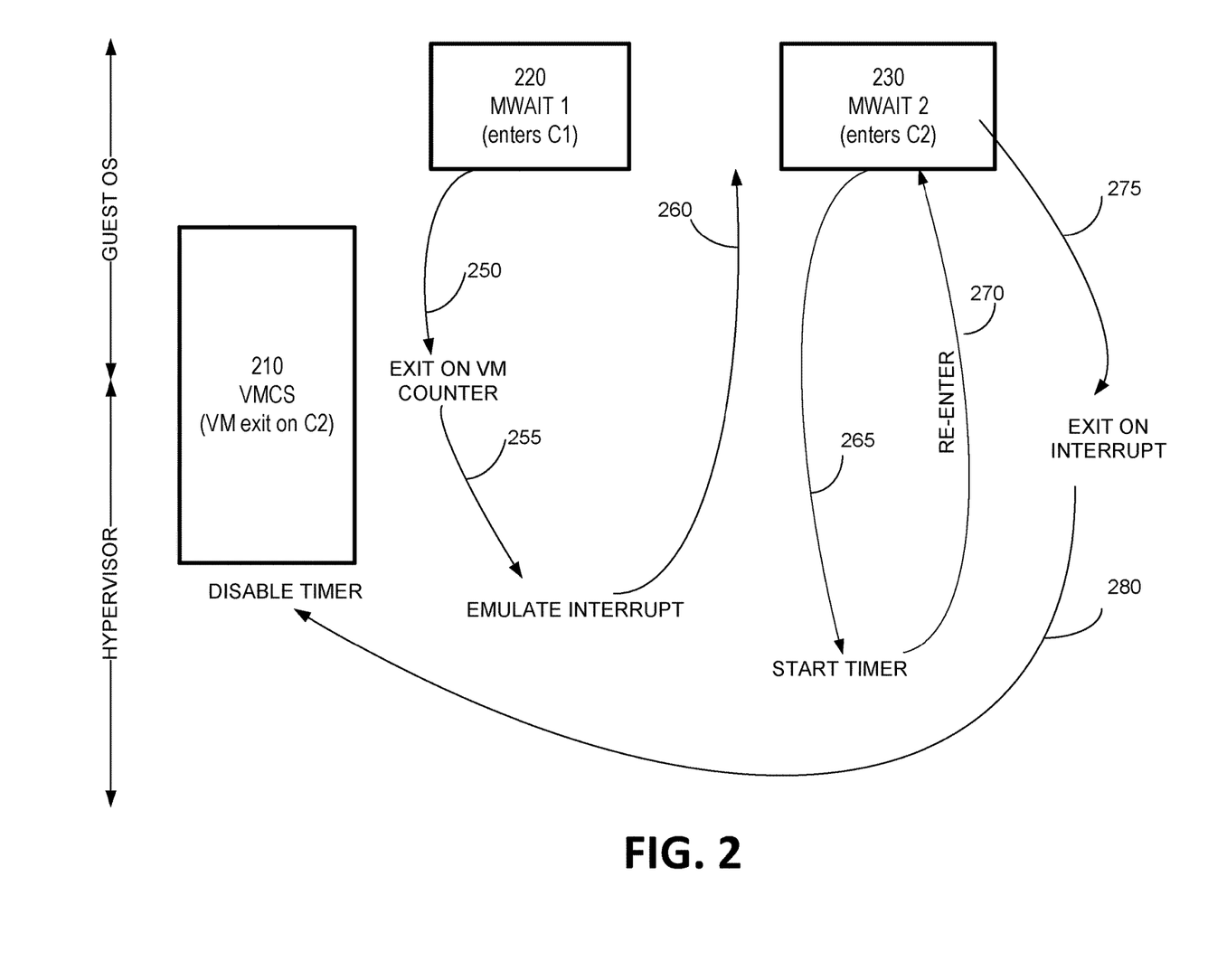
FIG. 2 schematically illustrates a configuration component whose settings control VM exit, in accordance with one or more aspects of the present disclosure.

FIG. 2 schematically illustrates VM state transitions and respective hypervisor actions performed in accordance with one or more aspects of the present disclosure. As shown in FIG. 2, the hypervisor configures the VMCS 210 to cause a VM exit upon detecting a vCPU transition to a power state in which the VM cycle counter would not be available (e.g., C2). Instruction 220 (e.g., MWAIT 1) causes the vCPU to enter C1 power state, while instruction 230 (e.g., MWAIT 2) causes the vCPU to enter C2 power state. Responsive to detecting the VM's transition to C2 (265), the hypervisor starts a timer for triggering a VM exit and resumes (270) the VM execution (e.g., by executing a VMRESUME instruction), thus allowing the VM to transition to C2 power state. Upon detecting the timer-triggered VM exit (275), the hypervisor can disable the timer (280) and enable the VM exits triggered by the VM cycle counter. In the power states allowing the VM cycle counter to operate (e.g., C1), the hypervisor detects VM exits (250) caused by the VM cycle counter, and emulates a timer interrupt (255) to preempt the running VM (260).

Figure 3:
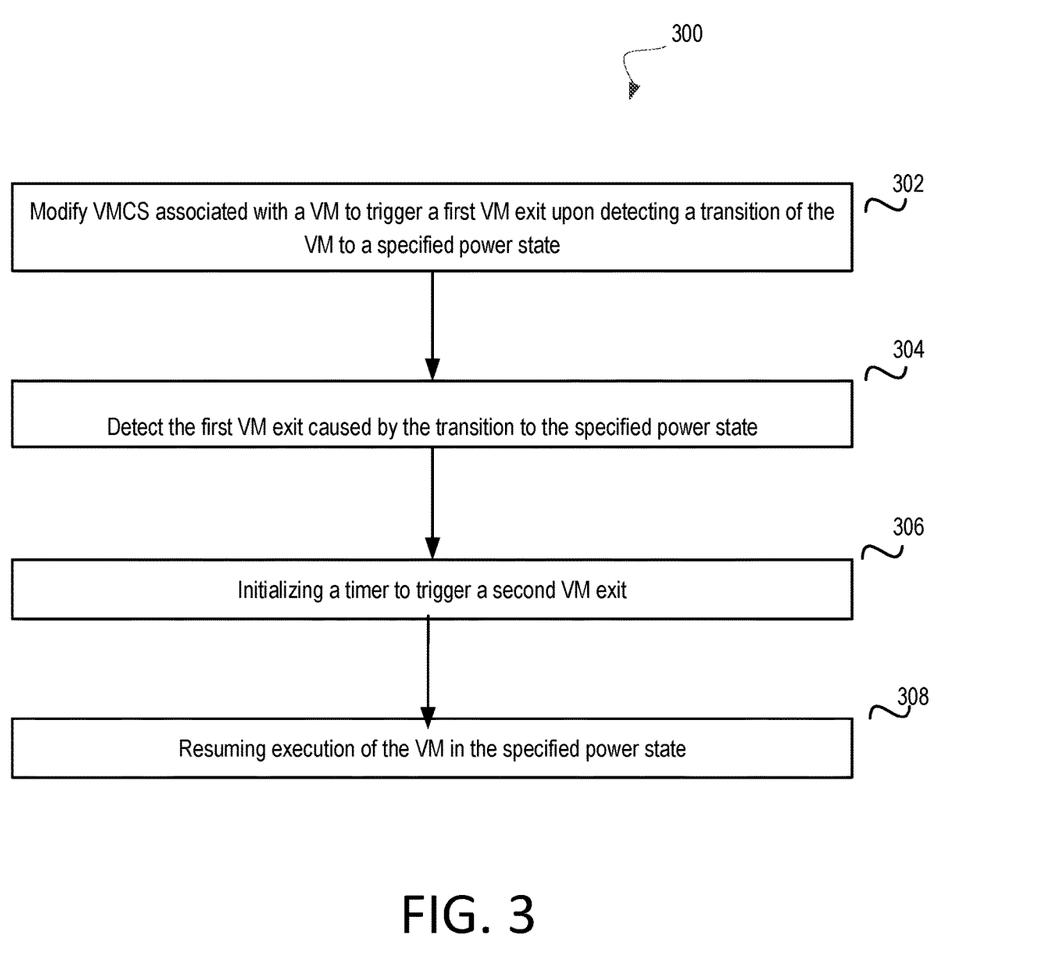
FIG. 3 depicts a flow diagram of an example method for managing VM exit by a hypervisor according to the setting of the configuration component, in accordance with one or more aspects of the present disclosure.

FIG. 3 depicts a flow diagram of an example method 300 for causing VM exit on a timer rather than on a VM cycle counter. Method 300 can be performed by processing logic that can comprise hardware (e.g., processing device, circuitry, dedicated logic, programmable logic, microcode, etc.), software (e.g., instructions run or executed on a processing device), or a combination thereof. In some embodiments, method 300 can be carried out by the VM exit management component 128 of FIG. 1.

At block 302, a hypervisor can modify a VMCS associated with a VM to trigger a VM exit upon detecting a transition of the VM to a specified power state in which the VM cycle counter is not available (e.g., C2 state). Note that, prior to this step, VMCS is configured to enable VM cycle counter to cause exit on counter expiration when the vCPU runs in a state where a VM cycle counter can operate. The hypervisor can configure the VMCS to cause immediate VM exit on a guest VM's attempt to enter a low-power idle state, such as C2. This is shown as 260 in FIG. 2.

At block 304, the hypervisor can detect a VM exit caused by the VM's transition to a low-power state where the VM cycle counter does not run, e.g., a C2 state. At block 306, the hypervisor can initialize a timer to trigger a VM exit upon the timer expiration. These operations are shown as 265 in FIG. 2.

At block 308, the hypervisor resumes execution of the VM (e.g., by executing a VMRESUME instruction), thus allowing the VM to enter the power state in which the VM cycle counter is not available. This is shown as 270 in FIG. 2.

Figure 4:
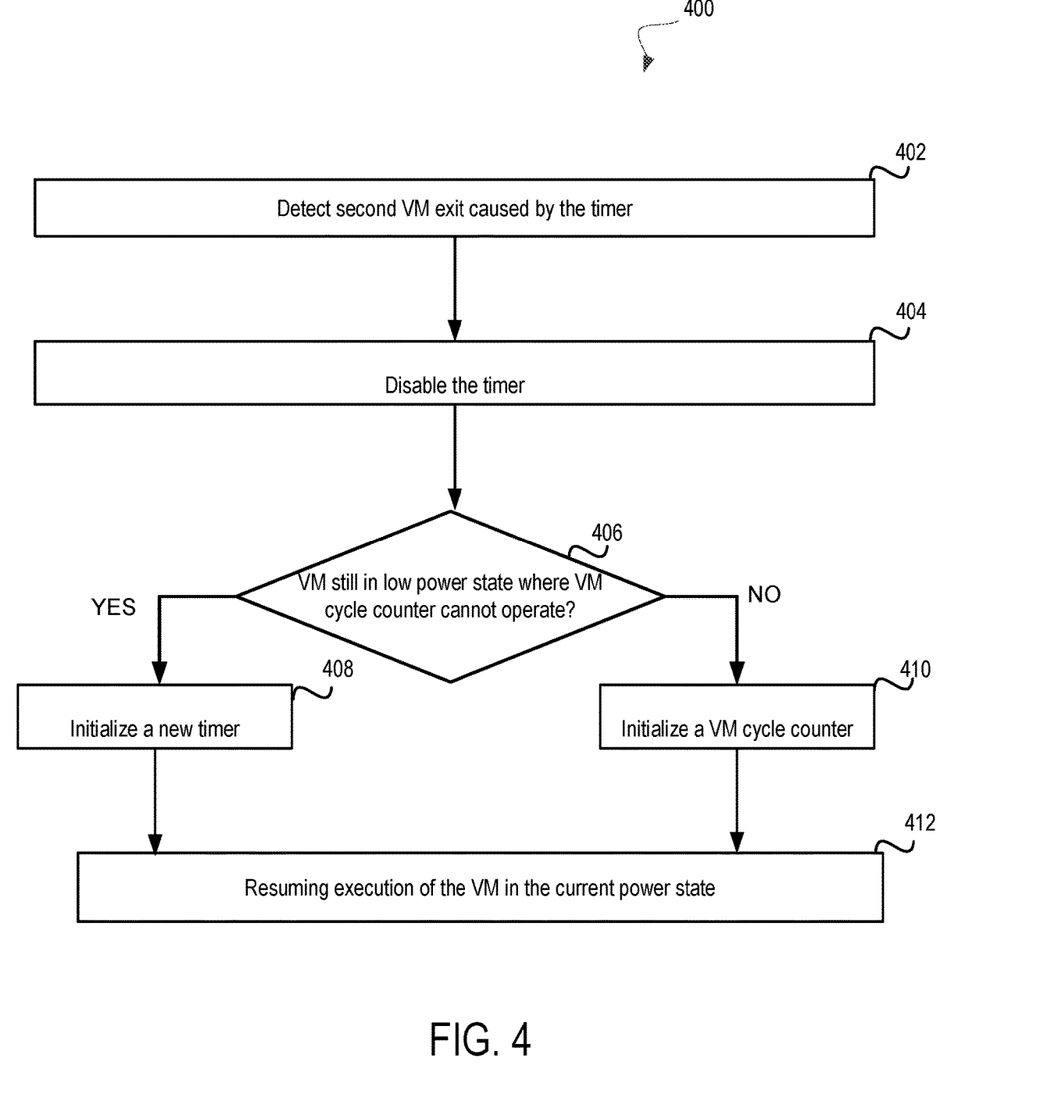
FIG. 4 depicts a flow diagram of an example method for initializing a new timer or a VM cycle counter depending on the power state, in accordance with one or more aspects of the present disclosure.

FIG. 4 depicts a flow diagram of an example method 400 for of an example method for initializing a new timer or a VM cycle counter depending on the power state. Method 400 can be performed by processing logic that can comprise hardware (e.g., processing device, circuitry, dedicated logic, programmable logic, microcode, etc.), software (e.g., instructions run or executed on a processing device), or a combination thereof. In some embodiments, method 400 can be carried out by the VM exit management component 128 (shown in FIG. 1) using the timer shown in FIG. 2.

At block 402, the hypervisor detects the second VM exit caused by the timer, while the guest VM has transitioned into a low-power state, e.g., C2 state, where VM cycle counter does not run.

At block 404, the hypervisor disables the timer. Note that once the timer is disabled, there is no mechanism to execute a VM at the low-power state, i.e. based on the default configuration of the VMCS, immediate and automatic VM exit would happen until the VMCS is reconfigured.

At the decision block 406, the hypervisor inspects the current power state of the VM. Based on the determination in decision block 406, the condition for next VM exit is set. If the VM is still in the low-power state where VM cycle counter is not supported (such as C2), then the method proceeds to block 408, where a VM exit is immediately triggered and a new timer is initialized. On the other hand, if the VM is at another low-power state where operation of VM cycle counter is supported (such as C1 or C0), then a VM exit is not immediately triggered, and a VM cycle counter is initialized. Alternatively, after the timer is disabled, the VMCS is configured to trigger a third VM exit upon performing a number of predefined processing cycles within the VM. This can be done upon VM initialization after disabling the timer.

At block 412, the hypervisor resumes execution of the VM (e.g., by executing a VMRESUME instruction), thus allowing the VM to be executed at the current power state. Note that the VM exit subsequent to block 412 is dictated by the configuration of the VMCS.

Persons skilled in the art will appreciate that configuring the VMCS to permit execution of the VM for the duration of the timer saves on interrupt overhead, and therefore, it is a cheaper solution for power management in a virtualized system, where host resources are multiplexed between a plurality of guest VMs.

Figure 5:
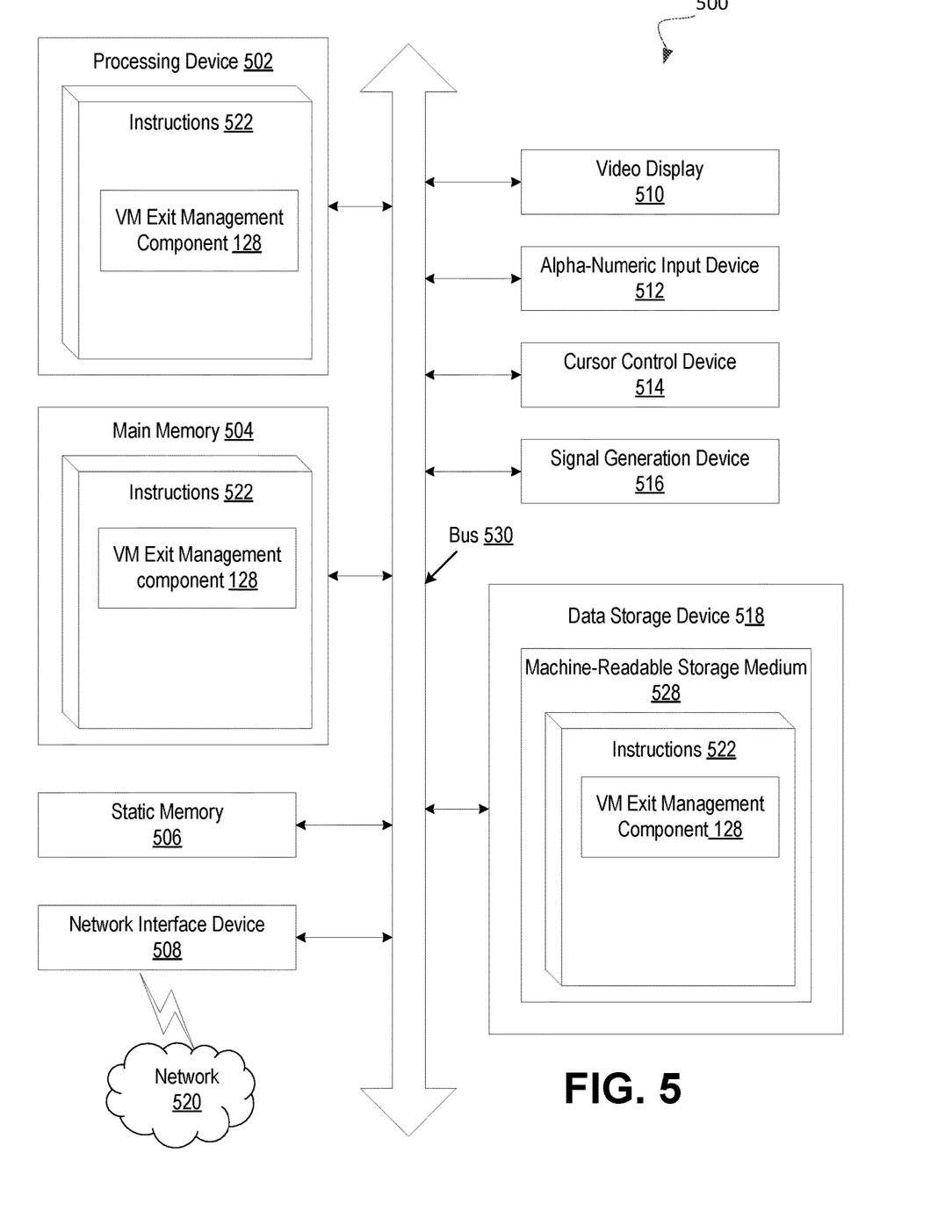
FIG. 5 depicts a block diagram of an illustrative computer system operating in accordance with examples of the invention.

FIG. 5 illustrates an example machine of a computer system 500 within which a set of instructions, for causing the machine to perform any one or more of the methodologies discussed herein, can be executed. In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 530. The processing device 502 can be operatively coupled with the main memory 504, static memory 506, and/or the data storage device 518.

Processing device 502 represents one or more general-purpose processing devices such as a microprocessor, a central processing unit, or the like. More particularly, the processing device can be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 can execute instructions 522 for performing the operations and steps discussed herein, for example, operations of the VM exit management component 128 shown in FIG. 1.

The computer system 500 can further include a network interface device 508. The computer system 500 also can include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 can include a machine-readable storage medium 528 (also known as a computer-readable medium) on which is stored one or more sets of instructions or software 522 embodying any one or more of the methodologies or functions described herein. The instructions 522 can also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for VM exit management component 128 shown in FIG. 1. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Although the operations of the methods herein are shown and described in a particular order, the order of the operations of each method can be altered so that certain operations can be performed in an inverse order or so that certain operation can be performed, at least in part, concurrently with other operations. In certain implementations, instructions or sub-operations of distinct operations can be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention can be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "receiving," "executing," "allowing," "disabling," "associating," "sending," "writing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct more specialized apparatus to perform the required method steps. The required structure for a variety of these systems will appear as set forth in the description below. In addition, the present invention is not described with reference to any particular programming language. It will be appreciated that a variety of programming languages can be used to implement the teachings of the invention as described herein.

The present invention can be provided as a computer program product, or software, that can include a machine-readable medium having stored thereon instructions, which can be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and can not necessarily have an ordinal meaning according to their numerical designation.

What is claimed is:

1. A method comprising:
    modifying, by a hypervisor managing a virtual machine (VM) running on a host computer system, a virtual machine control structure (VMCS) associated with the VM to trigger a first VM exit upon detecting a transition of the VM to a specified power state;
    detecting, by the hypervisor, the first VM exit caused by the transition of the VM to the specified power state;
    initializing a timer to trigger a second VM exit;
    resuming execution of the VM in the specified power state, wherein the specified power state is a first low-power state;
    modifying the VMCS to trigger a third VM exit upon performing a predefined number of processing cycles within the VM; and
    configuring the VMCS to start a VM cycle counter when the VM transitions to a second low-power state and the VM cycle counter operates in the second low-power state.

2. The method of claim 1, further comprising:
    responsive to detecting the second VM exit caused by the timer, disabling the timer.

3. The method of claim 1, wherein the VM cycle counter does not operate in the first low-power state.

4. The method of claim 1, further comprising:
    detecting a timer interrupt signal; and
    disabling the timer interrupt signal to cause delayed interruption.

5. A system comprising:
    a memory; and
    a processing device operatively coupled to the memory, the processing device to: modify, by a hypervisor managing a virtual machine (VM) running on a host computer system, a virtual machine control structure (VMCS) associated with the VM to trigger a first VM exit upon detecting a transition of the VM to a specified power state;
    detect, by the hypervisor, the first VM exit caused by the transition of the VM to the specified power state;
    initialize a timer to trigger a second VM exit;
    resume execution of the VM in the specified power state, wherein the specified power state is a first low-power state;
    modify the VMCS to trigger a third VM exit upon performing a predefined number of processing cycles within the VM; and
    configure the VMCS to start a VM cycle counter when the VM transitions to a second low-power state and the VM cycle counter operates in the second low-power state.

6. The system of claim 5, wherein the processing device is further to:
    responsive to detecting the second VM exit caused by the timer, disable the timer.

7. The system of claim 5, wherein the VM cycle counter does not operate in the first low-power state.

8. The system of claim 5, wherein the processing device is further to:
    detect a timer interrupt signal; and
    disable the timer interrupt signal to cause delayed interruption.

9. A non-transitory machine-readable storage medium including instructions that, when executed by a processing device, cause the processing device to:

modify, by a hypervisor managing a virtual machine (VM) running on a host computer system, a virtual machine control structure (VMCS) associated with the VM to trigger a first VM exit upon detecting a transition of the VM to a specified power state;

detect, by the hypervisor, the first VM exit caused by the transition of the VM to the specified power state;

initialize a timer to trigger a second VM exit; and resume execution of the VM in the specified power state, wherein the specified power state is a first low-power state;

modify the VMCS to trigger a third VM exit upon performing a predefined number of processing cycles within the VM; and configure the VMCS to start a VM cycle counter when the VM transitions to a second low-power state and the VM cycle counter operates in the second low-power state.

10. The non-transitory machine-readable storage medium of claim 9, wherein the processing device is further to:

responsive to detecting the second VM exit caused by the timer, disable the timer.

11. The non-transitory machine-readable storage medium of claim 9, wherein the VM cycle counter does not operate in the first low-power state.

* * * * *